United States Patent
Selen

(10) Patent No.: US 7,347,962 B2
(45) Date of Patent: Mar. 25, 2008

(54) APPARATUS AND METHOD FOR MANUFACTURING A SOCKET END OF A PIPE PART PROVIDED WITH A SEALING RING

(75) Inventor: Jacobus Hubertus Anna Selen, Eindhoven (NL)

(73) Assignee: Wavin B.V. (NL)

( * ) Notice: Subject to any disclaimer, the term of this patent is extended or adjusted under 35 U.S.C. 154(b) by 369 days.

(21) Appl. No.: 10/469,867

(22) PCT Filed: Mar. 4, 2002

(86) PCT No.: PCT/NL02/00136

§ 371 (c)(1),
(2), (4) Date: Mar. 4, 2004

(87) PCT Pub. No.: WO02/070225

PCT Pub. Date: Sep. 12, 2002

(65) Prior Publication Data

US 2004/0140670 A1    Jul. 22, 2004

(30) Foreign Application Priority Data

Mar. 6, 2001    (NL) .................................... 1017510

(51) Int. Cl.
  *B28B 7/20*    (2006.01)
  *B29C 45/14*   (2006.01)
(52) U.S. Cl. ...................... 264/255; 264/267; 264/318; 425/127; 425/DIG. 47; 425/DIG. 58
(58) Field of Classification Search .............. 264/250, 264/255, 267, 318; 425/127, DIG. 47, DIG. 58
See application file for complete search history.

(56) References Cited

U.S. PATENT DOCUMENTS 3,081,102 A    3/1963    Murray et al.

(Continued)

FOREIGN PATENT DOCUMENTS

DE    7 118 924    9/1971

(Continued)

OTHER PUBLICATIONS

International Search Report dated Nov. 6, 2001.

*Primary Examiner*—James M. Hewitt
(74) *Attorney, Agent, or Firm*—Blank Rome LLP

(57) ABSTRACT

Apparatus for manufacturing a socket end (12) which is provided with a sealing ring (9). The apparatus comprises an outer mould (1) for forming the outer contour of the sealing ring (9) and for forming the outer side of the socket end (12), and a core for forming the inner side of the socket end (12) and the sealing ring (9). The core comprises a first core part (7a), a sleeve-like core part (7) which can be displaced on the first core part (7a), for forming a front for the sealing ring (9), a core part (8) which adjoins the first core part (7a) and can be contracted in the radial direction, for forming the inner contour of the sealing ring (9), and a second core part (6), which adjoins the contractable core part (8), for forming the inner side of the pipe part. The contractable core part (8) has a radially innermost position with an external diameter which is smaller than the internal diameter of the sleeve-like core part (7).

9 Claims, 7 Drawing Sheets

U.S. PATENT DOCUMENTS

| | | | | |
|---|---|---|---|---|
| 4,351,791 A | * | 9/1982 | de Putter | 264/267 |
| 4,394,343 A | * | 7/1983 | Acda et al. | 264/296 |
| 4,410,479 A | | 10/1983 | Cyriax | |
| 4,468,367 A | * | 8/1984 | Beune et al. | 264/255 |
| 4,474,723 A | * | 10/1984 | Irmer | 264/296 |
| 4,743,422 A | * | 5/1988 | Kalriis-Nielsen et al. | 264/255 |
| 5,683,647 A | * | 11/1997 | Kawasaki et al. | 264/513 |
| 6,969,481 B2 | * | 11/2005 | Schnallinger | 264/266 |

FOREIGN PATENT DOCUMENTS

| | | |
|---|---|---|
| EP | 0451 900 | 10/1991 |
| EP | 0 556 545 | 2/1992 |
| EP | 0 936 046 | 8/1999 |
| FR | 2109145 | 5/1972 |
| JP | 58171913 | 10/1983 |
| NL | 1008 8269 | 8/1999 |

* cited by examiner

APPARATUS AND METHOD FOR MANUFACTURING A SOCKET END OF A PIPE PART PROVIDED WITH A SEALING RING

The invention relates to an apparatus for manufacturing a socket end of a pipe part, which socket end is provided, on the inner side, with a sealing ring which is fixedly connected thereto, the socket end being manufactured from a relatively rigid thermoplastic material and the sealing ring being manufactured from a thermoplastic elastomer which is compatible therewith, and the socket end comprising a first cylindrical part of a defined internal diameter, a groove part which axially adjoins the first cylindrical part on the outer side and has a larger internal diameter than that of the first cylindrical part, in which groove part the sealing ring is arranged, and an edge part which adjoins the groove part and has a smaller internal diameter than that of the groove part, which apparatus comprises an outer mould for forming the outer contour of the sealing ring and for forming the outer side of the socket end, and a core for forming the inner side of the socket end and the sealing ring.

The invention also relates to a method for manufacturing a socket end of a pipe part, in which first of all the sealing ring is formed in a first mould cavity, and then the socket end is formed in a second mould cavity which adjoins the sealing ring which has already been formed.

An apparatus and method of this type are known from U.S. Pat. No. 4,173,362. In this known apparatus and method, the core, after the socket end has been formed at the location of the sealing ring, is divided into an axially outermost core part and an axially innermost core part. During demoulding of the socket end, first of all the outer mould is opened, and then the axially outermost core part is pulled out of the socket end. Then, the axially innermost core part is pulled out of the socket end over the sealing ring.

The known apparatus and method have the drawback that, when the axially innermost core part is being pulled out of the socket end, there is a risk of the sealing ring being damaged.

It is an object of the invention to provide an apparatus and a method for forming a socket end of a pipe part, in which the risk of damage to the sealing ring formed in the socket end is minimized.

SUMMARY OF THE INVENTION

Use of the apparatus and method according to the invention prevent the sealing ring from being damaged while the core is being pulled out of the socket end. This is because the core has a smooth surface as it slides along the sealing ring.

Advantageously, the outer mould is opened during demoulding before the sleeve-like core part is moved towards the axially innermost position, so that there is no wear to the surfaces of the core and the outer mould which move along one another.

BRIEF DESCRIPTION OF THE DRAWINGS

The invention will be explained in more detail below with reference to the drawing, in which.

DETAILED DESCRIPTION OF THE INVENTION

Figure 1:
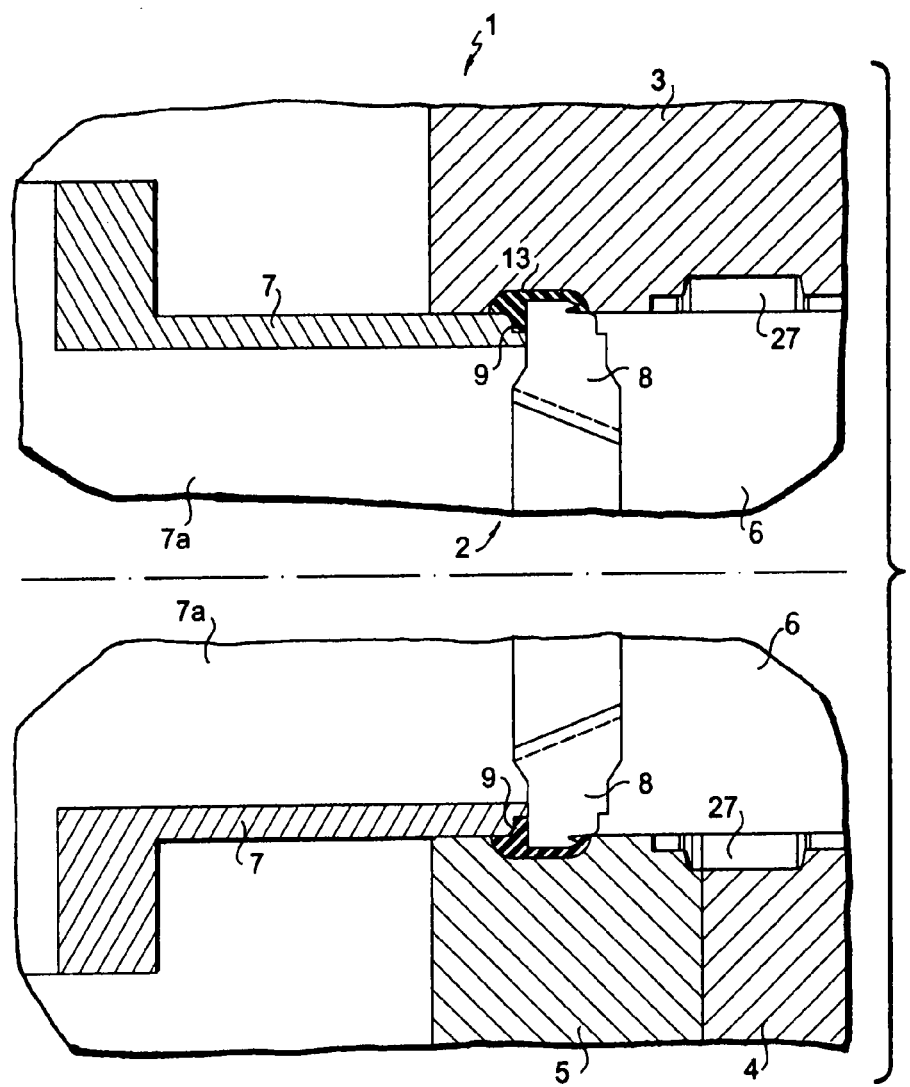
FIG. 1 shows a longitudinal section through an apparatus according to the invention while the sealing ring is being formed.
Figure 3:
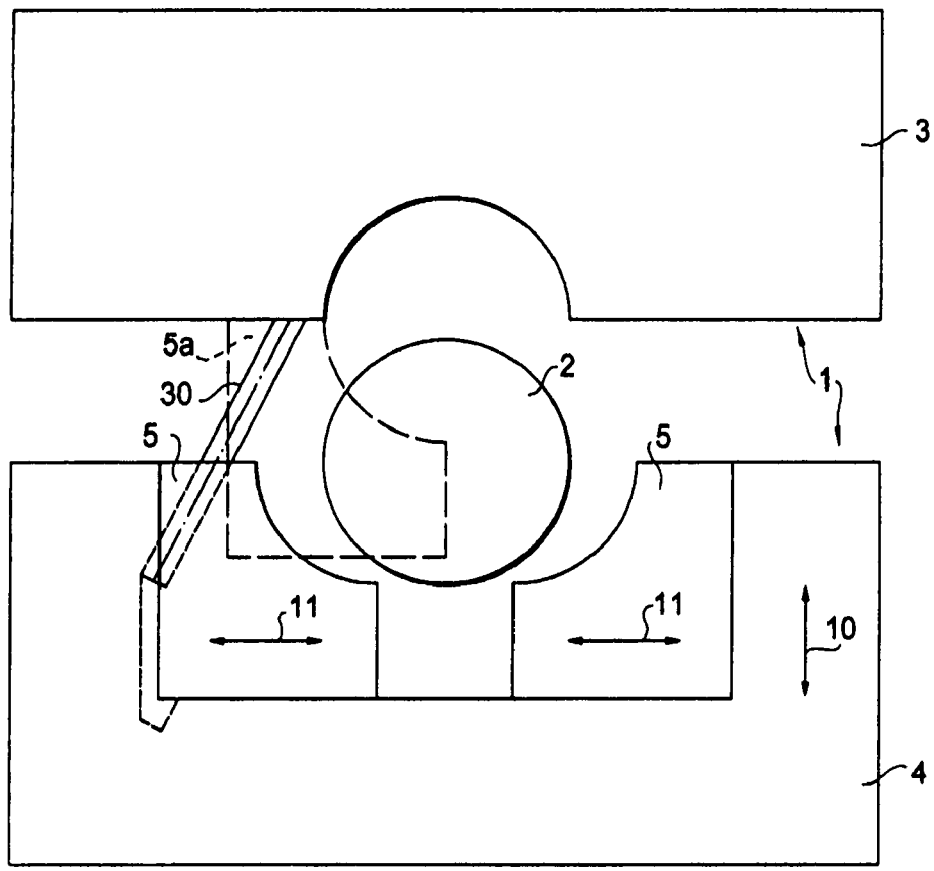
FIG. 3 shows a cross section through the apparatus in a position which corresponds to that shown in FIG. 2.

FIG. 1 shows an apparatus comprising an outer mould 1 and a core 2. The outer mould 1 comprises a fixed mould half 3 and a movable mould half 4. The movable mould half 4 has a number of displaceable mould parts 5. In FIG. 3, the double arrow 10 indicates how the movable mould half 4 can move with respect to the fixed mould half 3. The displaceable mould parts 5 can be displaced with respect to the movable mould half 4. The direction of displacement of the displaceable mould parts is indicated by the double arrows 11. In the preferred embodiment shown here, the movable mould half 4 and the displaceable mould parts 5 are coupled via a slide mechanism 30 in such a manner that, when the outer mould 1 is closed and is being opened, i.e. the movable mould half 4 is being moved away from the fixed mould half 3, the displaceable mould parts 5 slide outwards away from the core 2, and when the outer mould 1 is being closed, i.e. the movable mould half 4 is being moved towards the fixed mould half 3, the displaceable mould parts 5 slide inwards towards the core 2. In FIG. 3, for the purpose of illustration, the slid-inward position of one of the displaceable mould parts 5 is illustrated by a dashed line and is denoted by 5a.

In an alternative embodiment, the coupling of the movement of the movable mould half 4 and the displacement of the displaceable mould parts 5 may be absent, so that displacement of the displaceable mould parts 5 can take place independently of the movement of the movable mould half 4.

The core 2 comprises a first core part 7a, a sleeve-like core part 7 which can be displaced axially on the first core part 7a, a radially contractible core part 8 which axially adjoins the first core part, and a second core part 6 which adjoins the contractible core part 6 in the axial direction.

In the position illustrated in FIG. 1, the outer mould 1 is closed. A first mould cavity is delimited by the fixed mould half 3, the displaceable mould parts 5, the sleeve-like core part 7 and the radially contractible core part 8. This first mould cavity is filled with a thermoplastic elastomer in order to form a sealing ring 9, the outer contour of the sealing ring being shaped by a mould cavity 13 in the outer mould 1.

Figure 2:
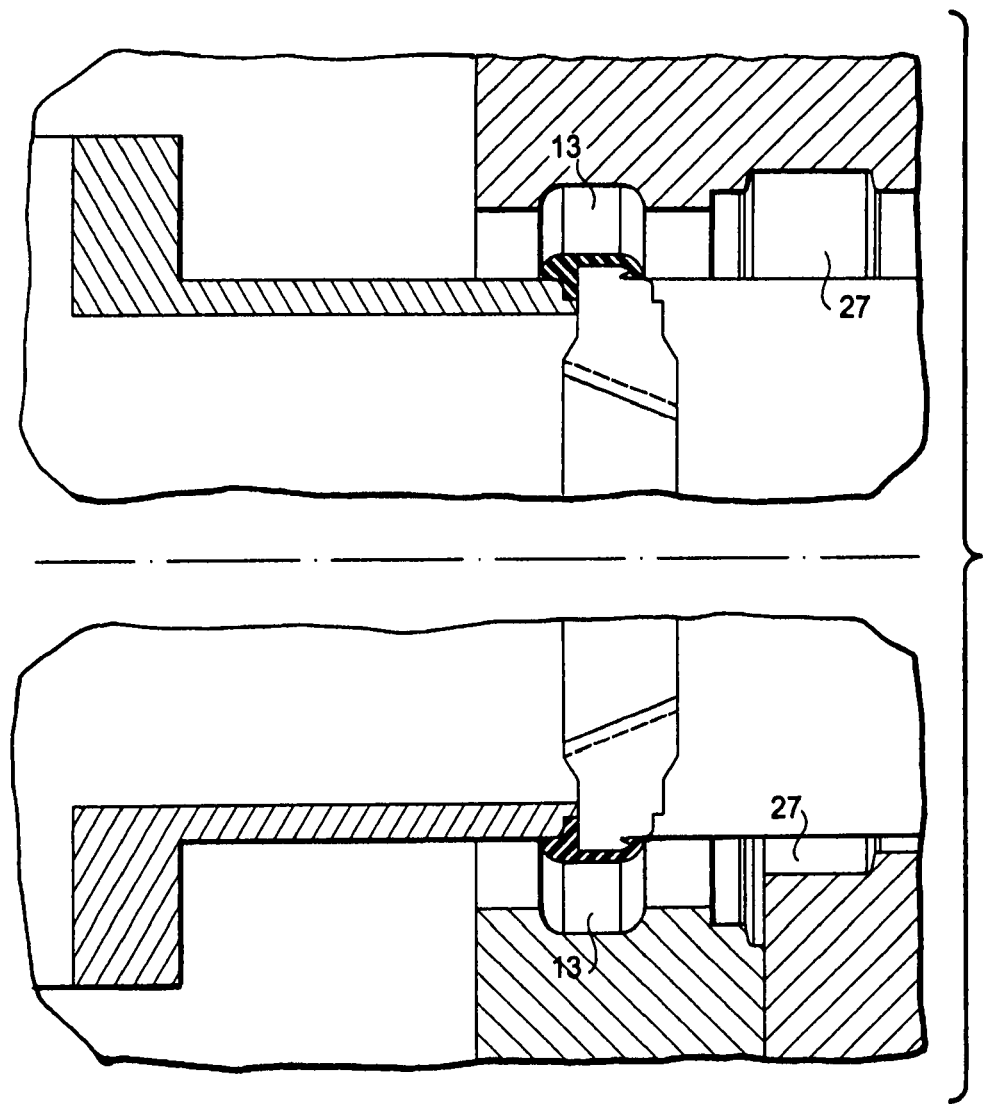
FIG. 2 shows a longitudinal section through the apparatus shown in FIG. 1 with an open outer mould.

When the sealing ring 9 is dimensionally stable, the outer mould 1 is opened, as shown in FIG. 2 and FIG. 3. This creates space for the core 2 and the sealing ring 9 formed thereon, in order to allow axial displacement with respect to the outer mould 1. The core 2 with the sealing ring 9 is then displaced axially towards a position which lies further inwards in the axial direction, in which position the sealing ring 9 is located at the level of a mould cavity 27 arranged in the outer mould 1. Then, the outer mould 1 is closed, so that a second mould cavity, which adjoins the sealing ring 9, is formed. FIG. 4 shows that the second mould cavity is filled by injection-moulding a relatively rigid plastic material which is compatible with the material of the sealing ring.

This rigid plastic material may, for example, be polypropylene. In this way, a socket end 12 of a pipe part is formed.

The socket end 12 has a first cylindrical part 15 of a defined diameter. In the vicinity of the free end of the socket end 12, a groove part 16 adjoins the first cylindrical part 15. The internal diameter of the groove part 16 is greater than that of the first cylindrical part 15. From the groove part 16, an adjoining cylindrical edge part 17 extends towards the free end. The edge part 17 has a smaller diameter than the groove part 16.

The sealing ring 9 is accommodated in the groove part 16. The sealing ring 9 comprises a first lip 18, which extends radially inwards and is located in the vicinity of the transition between the groove part 16 and the edge part 17. The first lip 18 has a base section 19, which extends axially from the first lip 18 towards the edge part 17 in the groove part 16. The presence of the base section 19 has the advantage that, when the first lip 18 is bent radially outwards, for example when another pipe part is being fitted into the socket end 12, the connection between the sealing ring 9 and the socket end 12 at the location of the transition 19a between the edge part 17 and the sealing ring 9 does not tear off. The transition 19a is preferably smooth, so that when another pipe part is being inserted into the socket end 12, this pipe part cannot get stuck behind an uneven part of the transition 19a and tear the sealing ring 9 off the socket end 12. The transition between the first lip 18 and the base section 19 preferably has a certain radius. This rounding of the transition is used to prevent stress peaks in said transition when the first lip 18 is being bent radially outwards. At the transition between the groove part 16 and the first cylindrical part 15 of the socket end 12, the sealing ring 9 comprises a second lip 20 which extends axially towards the first lip 18. When the socket end 12 is being formed in the second mould cavity, hot plastic material is introduced, which plastic material is fixedly joined to the sealing ring 9. The second lip 20 has the advantage that the inner side of the sealing ring 9 remains securely fixed to the contractible core part, so that the hot plastic material cannot reach and affect the inner side of the sealing ring 9. An annular wall 21 extends along the internal diameter of the groove part 16, between the second lip 20 and the first lip 18. The first lip 18, the second lip 20 and the annular wall 21 delimit a cavity 22, which is formed by the radially contractible core part 8 (cf. FIG. 1). The cavity 22 lies inside the groove part 16 of the socket end 12. The depth of the cavity 22 is greater than the thickness of the first lip 18, so that when another pipe part is being inserted into the socket end 12 the first lip 18 fits into the cavity 22. The axial length of the cavity 22 is greater than the length of the first lip 18 and the second lip 20 together, so that when another pipe part is being inserted into the socket end 12 the first lip 18 and the second lip 20 do not come into contact with and get in the way of one another.

That side of the first lip 18 which faces towards the edge part 17 is free from radially extending unevenness, so that a good seal is obtained and, during insertion of another pipe part into the socket end 12, it is impossible for there to be any leakage along the first lip 18 of sealing ring 9 and the inserted pipe part.

Figure 4A:
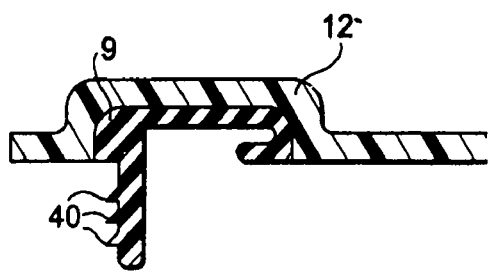
FIG. 4a shows a longitudinal section through a part of a socket end according to the invention.
Figure 4B:
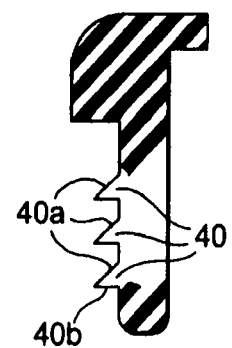
FIG. 4b shows a detailed view of a longitudinal section through a first lip of the sealing ring of the socket end shown in FIG. 4a, FIGS. 5-7 show the successive steps involved in demoulding the socket end using the apparatus shown in FIG. 1.
Figure 4:
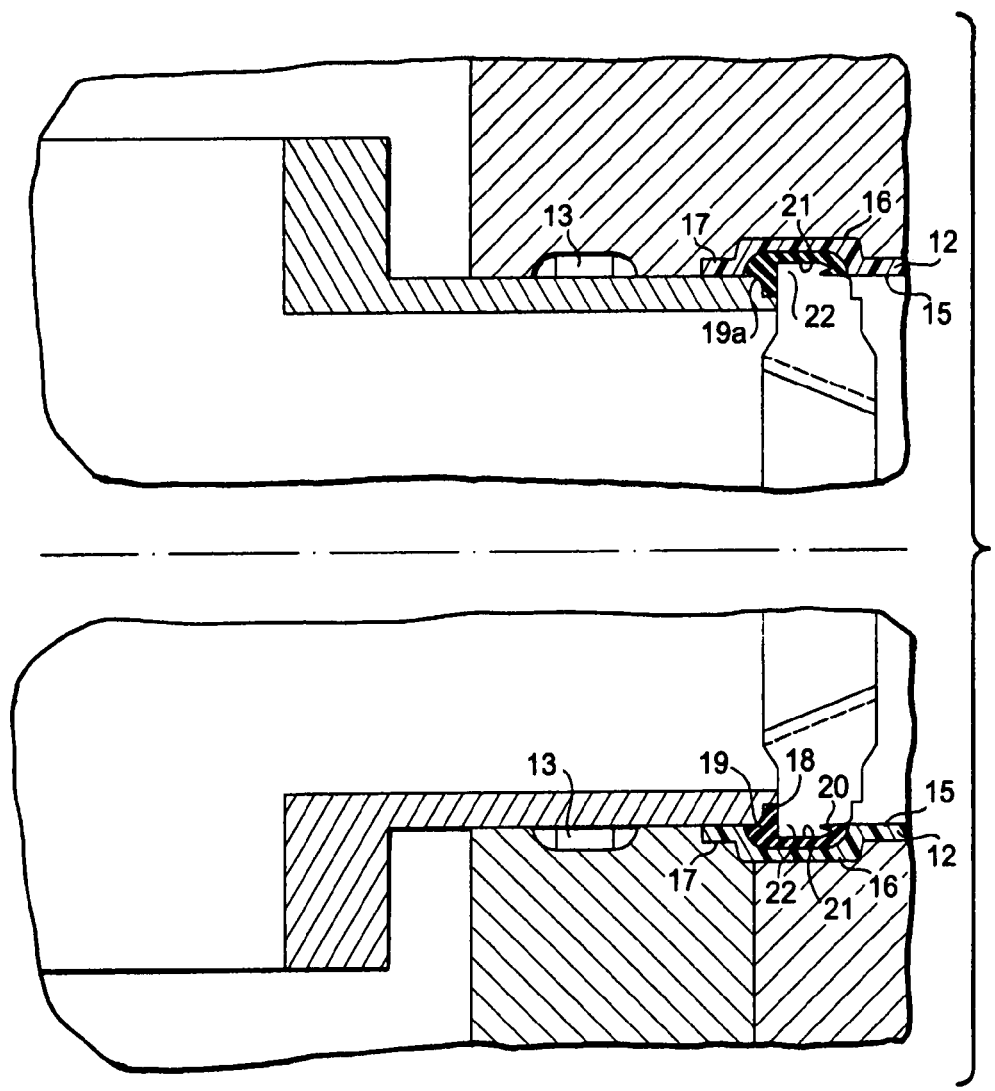
FIG. 4 shows a longitudinal section through the apparatus shown in FIG. 1 while a socket end is being formed.

That side of the first lip 18 which faces towards the edge part 17 is provided with continuous, encircling thickened portions 40, as shown in FIG. 4a. Each thickened portion 40 has a radially outermost side 40a and a radially innermost side 40b, as shown in FIG. 4b, each thickened portion 40 gradually increasing on the radially outermost side 40a and decreasing greatly on the radially innermost side 40b. On account of their shape, the thickened portions form a labyrinth seal, leading to improved sealing.

Figure 5:
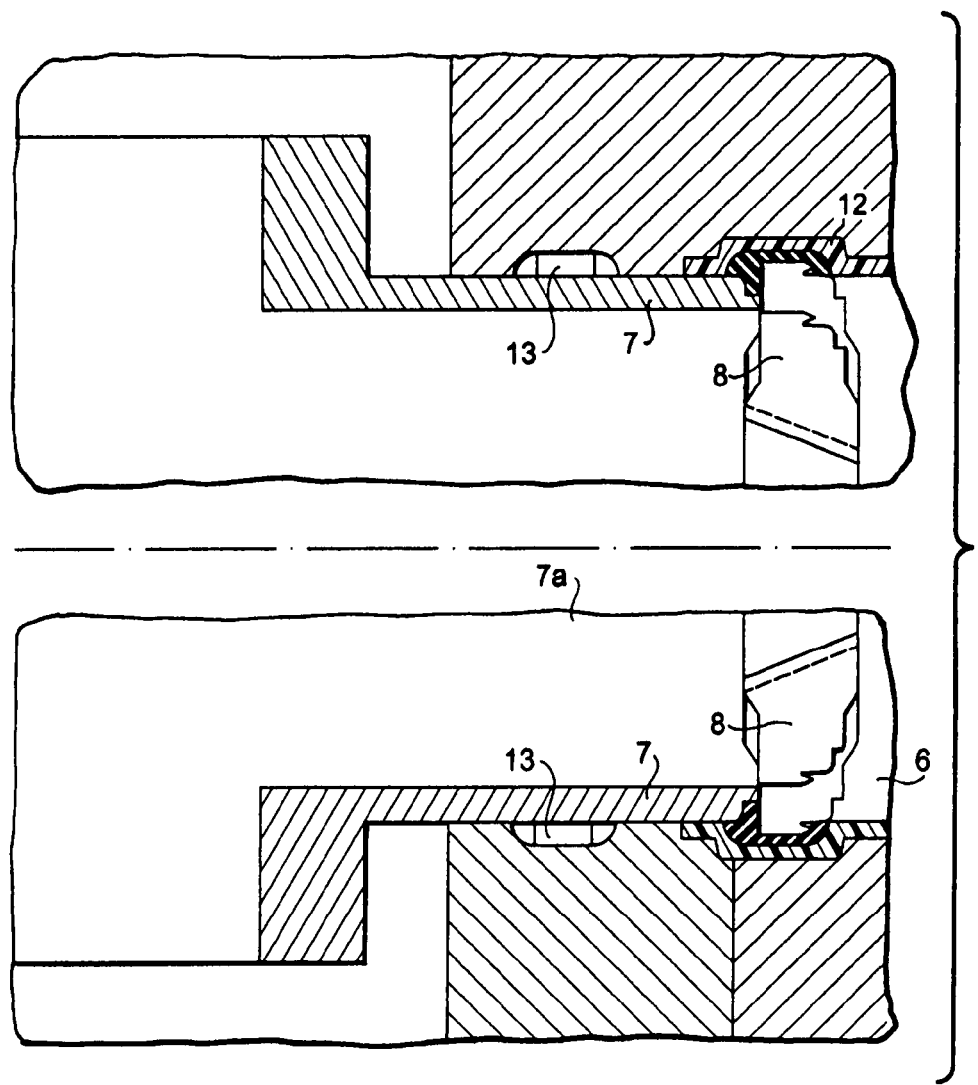
Figure 6:
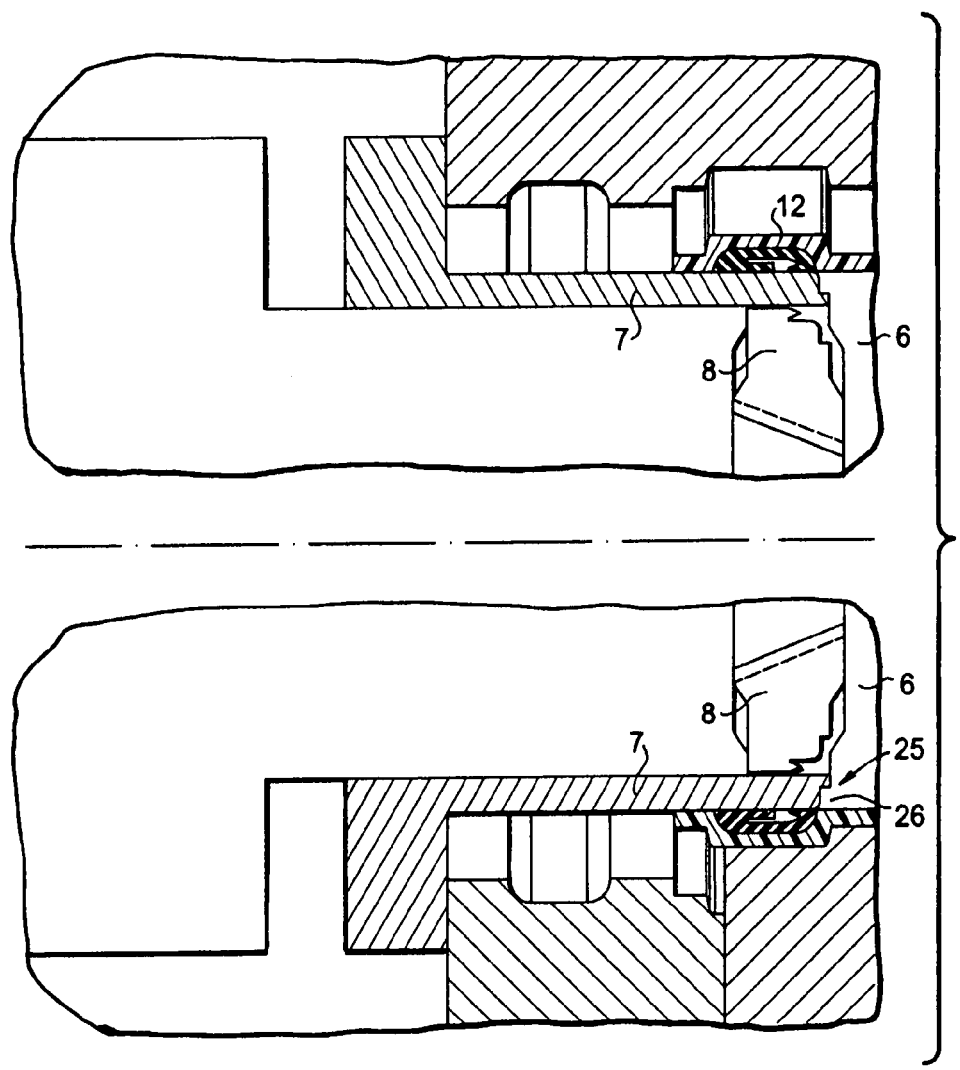

In the text which follows, the demoulding of the socket end 12 will be explained with reference to FIGS. 5-7. When the socket end 12 is sufficiently dimensionally stable, the radially contractible core part 8 can be contracted, as shown in FIG. 5.

The external diameter of the contractible core part 8 is smaller, in the contracted position, than the internal diameter of the sleeve-like core part 7.

Then, the outer mould 1 is opened, after which the sleeve-like core part 7 is displaced axially inwards, towards the second core part 6, with respect to the first core part 7a. Before this displacement of the sleeve-like core part 7, the outer mould 1 is opened, in order to prevent wear to surfaces of the outer mould 1 and the core 2 which slide along one another.

The end side 25 of the sleeve-like core part 7 is shaped in such a manner that it is complementary to an edge section 26 of the second core part 6. This allows accurately fitting connection of he two core parts 6 and 7. The sleeve-like core part 7 is slid over the radially contractible core part 8, and the end side 25 of the sleeve-like core part 7 is placed against the edge section 26 of the second core part 6, as shown in FIG. 6. The external diameter of the sleeve-like core part 7 corresponds to that of the second core part 6. When the sleeve-like core part 7 and the second core part 6 adjoin one another, the core 2 has a smooth outer surface.

When the sleeve-like core part 7 is being displaced axially inwards, the first lip 18 of the sealing ring 9 is pressed radially outwards by the sleeve-like core part 7. The first lip 18 is pressed into the cavity 22 of the sealing ring 9. Since the cavity 22 has a depth which is greater than the thickness of the first lip 18, the first lip 18 fits completely into the cavity 22, which facilitates the step of pressing the lip 18 outwards. The rounding of the transition between the first lip 18 and the base section 19 has the advantage that, during the deformation of the first lip 18, the material of the sealing ring is prevented from tearing in the transition region. It is preferable for the free end of the second lip 20 to be directed slightly radially outwards in the cavity 22. This prevents this second lip 20, while the sleeve-like core part 7 is sliding axially inwards, from being carried along by this core part so that it is deformed and passes between the sleeve-like core part 7 and the second core part 6, which can cause damage.

Figure 7:
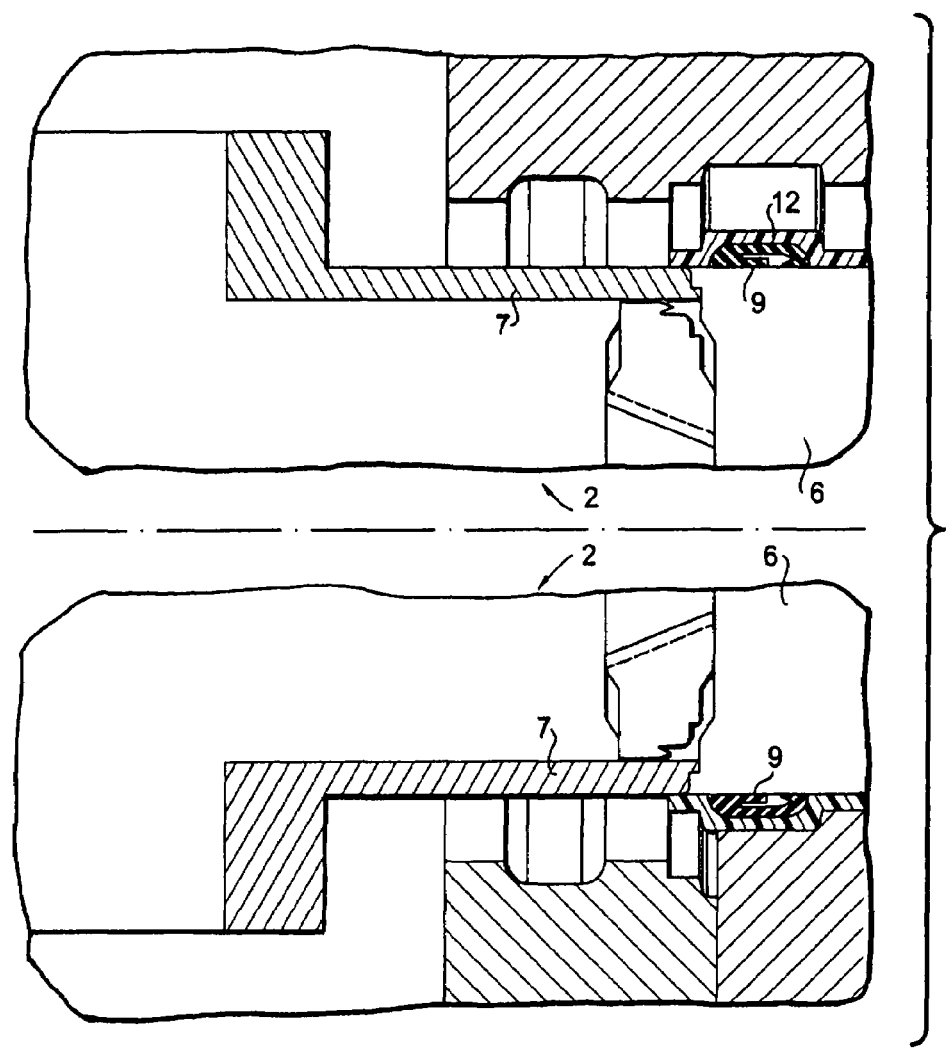

Finally, the core 2 is pulled axially out of the socket end 12 as a single unit, as shown in FIG. 7. Since the outer surface of the mutually adjoining second core part 6 and the sleeve-like core part 7 is a smooth surface, the core will slide along the sealing ring 9 with little resistance, preventing damage to the sealing ring 9.

The invention claimed is:

1. Apparatus for manufacturing a socket end of a pipe part, which socket end is provided, on the inner side, with a sealing ring which is fixedly connected thereto, the socket end being manufactured from a relatively rigid thermoplastic material and the sealing ring being manufactured from a thermoplastic elastomer which is compatible therewith, and the socket end comprising a first cylindrical part of a defined internal diameter, a groove part which axially adjoins the first cylindrical part on the outer side and has a larger internal diameter than that of the first cylindrical part, in which groove part the sealing ring is arranged, and an edge part which adjoins the groove part and has a smaller internal diameter than that of the groove part, which apparatus comprises:

an outer mould for forming the outer contour of the sealing ring and for forming the outer side of the socket end, and a core for forming the inner side of the socket end and the sealing ring, characterized in that the core comprises a first core part, a sleeve-like core part, which can be displaced on the first core part in the axial direction between an outermost position and an innermost position, for forming a front for the sealing ring and the inner side of the edge part, a contractible core part, which adjoins the first core part in the axial direction and can be moved in the radial direction between an outermost position and an innermost position, for forming the inner contour of the sealing ring, and a second core part, which adjoins the contractible core part in the axial direction, for forming the inner side of the pipe part, the radially contractible core part, in the radially innermost position, having an external diameter-which is smaller than the internal diameter of the sleeve-like core part.

2. Apparatus according to claim 1, in which the sleeve-like core part, in the axially outermost position, adjoins, by means of its end side, the contractible core part, which is in the radially outermost position, and, in the axially innermost position, adjoins, by means of an end side, the second core part in a fitting manner, in which arrangement, in the situation in which the sleeve-like core part is in the axially outermost position and the contractible core part is in the radially outermost position, the sleeve-like core part adjoins, by means of its end side, the contractible core part and, in the situation in which the sleeve-like core part is in the axially innermost position and the contractible core part is in the radially innermost position, the sleeve-like core part, by means of its end side, adjoins the second core part, the contractible core part being situated inside the sleeve-like core part.

3. Apparatus according to claim 1, in which the sleevelike core part, in the axially innermost position, adjoins the second core part in a fitting manner, such that the core has a smooth outer surface.

4. Apparatus according to claim 1, in which the outer mould has a fixed mould half and a movable mould half, the movable mould half being movable substantially perpendicular to the centre axis of a mould cavity which is enclosed by the outer mould in the closed position.

5. Apparatus according to claim 4, in which the movable mould half has a number of displaceable mould parts which can be displaced transversely to the direction of movement of the movable mould half and substantially perpendicular to the centre axis of the mould cavity.

6. Apparatus according to claim 5, in which the movable mould half and the displaceable parts thereof are mechanically coupled in such a manner that the movement of the mould half simultaneously causes displacement of the displaceable mould parts.

7. Apparatus according to claim 4, in which the core is mechanically connected to the movable mould half in such a manner that the core substantially follows the movement of the movable mould half when the mould is being opened.

8. Method for manufacturing a socket end of a pipe part, which socket end is provided, on the inner side, with a sealing ring which is fixedly connected thereto, the socket end being manufactured from a relatively rigid thermoplastic material and the sealing ring being manufactured from a thermoplastic elastomer, and the socket end comprising a first cylindrical part of a defined internal diameter, a groove part which axially adjoins the first cylindrical part on the outer side and has a larger internal diameter than that of the first cylindrical part, in which groove part the sealing ring is arranged, and an edge part, which adjoins the groove part and has a smaller internal diameter than that of the groove part, use being made of the apparatus according to one of the preceding claims, which method comprises the following steps:

moulding the sealing ring in a first mould cavity which is delimited by the core and the outer mould, the sleeve-like core part being located in the axially outermost position and the contractible core part being located in the radially outermost position, opening the outer mould, displacing the outer mould and the core with the sealing ring thereon in the axial direction with respect to one another, and closing the outer mould again, during which process a second mould cavity is formed, which adjoins the sealing ring which has already been formed, forming the socket end in the second mould cavity, during which process the socket end and the sealing ring are fixedly connected to one another, demoulding the socket end, during which process the contractible core part is pulled radially inwards towards the radially innermost position, the sleeve-like core part is pushed over the retracted contractible core part into the axially innermost position, in which it adjoins the second core part in a fitting manner and then the core as a unit is pulled out of the socket end in the axial direction.

9. Method according to claim 8, in which the outer mould, during the demoulding, is opened before the sleeve-like core part is moved towards the axially innermost position.

* * * * *